United States Patent [19]
Ito et al.

[11] Patent Number: 5,978,038
[45] Date of Patent: Nov. 2, 1999

[54] IMAGE INFORMATION PROCESSING APPARATUS USING SINGLE PHASE-LOCKED LOOP

[75] Inventors: Hiroya Ito, Hashima; Kunio Okada, Iruma, both of Japan

[73] Assignees: Sanyo Electric Co., Ltd., Osaka; Casio Computer Co., Ltd., Tokyo, both of Japan

[21] Appl. No.: 08/895,457

[22] Filed: Jul. 16, 1997

[30] Foreign Application Priority Data

Jul. 17, 1996 [JP] Japan .................................... 8-187508

[51] Int. Cl.[6] ............................... H04N 5/04; H04N 9/44
[52] U.S. Cl. ....................... 348/500; 348/497; 348/505; 348/663
[58] Field of Search ....................... 348/497.9, 505–663, 348/539, 549

[56] References Cited

U.S. PATENT DOCUMENTS

| | | | |
|---|---|---|---|
| 3,578,902 | 5/1971 | Monsay | 386/16 |
| 3,681,518 | 8/1972 | Hidaka et al. | 348/499 |
| 4,292,648 | 9/1981 | Kowal | 386/10 |
| 4,313,129 | 1/1982 | Fukui | 386/2 |
| 4,326,216 | 4/1982 | Jensen | 386/15 |
| 4,459,610 | 7/1984 | Abe et al. | 386/6 |
| 4,975,767 | 12/1990 | Sorenson | 348/527 |
| 5,025,310 | 6/1991 | Sekiya et al. | 348/506 |
| 5,280,345 | 1/1994 | Uehara et al. | 348/498 |

*Primary Examiner*—John K. Peng
*Assistant Examiner*—Linus H. Lo
*Attorney, Agent, or Firm*—Sheridan Ross P.C.

[57] ABSTRACT

An image information processing apparatus is described that suppresses noise generated in digital signal processing while preventing the circuit scale from enlarging. The apparatus includes a separator, a first detector, a second detector, a phase-locked loop, an A/D converter, a phase difference detector, a chrominance data processor and a luminance data processor. The phase difference detector detects a phase difference between the reference clock signal and the scan sync signal. The luminance data processor combines the luminance data in Units of two pieces to produce compensated luminance data in accordance with the phase difference.

8 Claims, 4 Drawing Sheets

IMAGE INFORMATION PROCESSING APPARATUS USING SINGLE PHASE-LOCKED LOOP

BACKGROUND OF THE INVENTION

1. Field of the Invention

The present invention relates generally to an image information processing apparatus. More particularly, this invention relates to an image information processing apparatus that separates an image signal into a luminance component and a chrominance component and produces luminance data and chrominance data using a single phase-locked loop.

2. Description of the Related Art

An image signal for reproducing a color image on a monitor screen includes a luminance component, a chrominance component and a sync component. The luminance component represents the tone of an image. The chrominance component expresses color. The sync component represents information about various types of synchronizations, such as horizontal synchronization and vertical synchronization. Those components are separated from one another by using characteristics like the difference in amplitude of each components and phase deviation, which yields a luminance signal, a chrominance signal and a sync signal. Image processing is performed using those signals. Digital signal processing, which is not easily susceptible to a temperature variance, noise, etc. is likely to be used in this image processing.

FIG. 1 is a block diagram showing an image information processing apparatus which is based on digital signal processing. FIG. 2 is a waveform chart illustrating signals that are handled in the apparatus in FIG. 1.

The image information processing apparatus includes a Y/C separator 1, first and second amplifiers 2 and 4, first and second A/D converters 3 and 5, a sync detector 6, first and second phase-locked loops (PLLs) 7 and 9, a burst detector 8 and an image data processor 10.

The Y/C separator 1 receives an image signal "i" and separates the image signal to a luminance component and a chrominance component using the phase difference of the chrominance component, thereby yielding a luminance signal "y" and a chrominance signal "c". In the case of the NTSC form, for example, the luminance component is acquired by adding an image signal, which is the image signal "i" shifted by one horizontal scan period, to the image signal "i". The chrominance component is acquired from the difference between the image signal "i" and the shifted image signal.

The first amplifier 2 is a high-frequency amplifier configured to cope with the video signal band that corresponds to the luminance signal "y" and amplifies the luminance signal "y" to have a predetermined amplitude. The first A/D converter 3 receives the amplified luminance signal "y" from the amplifier 2 and quantizes the amplified luminance signal "y" in accordance with a first sampling clock signal SC1 to produce luminance data Y0.

The second amplifier 4 is a high-frequency amplifier configured to cope with the chrominance signal "c" and amplifies the chrominance signal "c" to have a predetermined amplitude. The second A/D converter 5 receives the amplified chrominance signal "c" from the second amplifier 4 and quantizes the amplified chrominance signal "c" in accordance with a second sampling clock signal SC2 to produce chrominance data C0.

The sync detector 6 receives the image signal "i" and obtains a sync component from the image signal "i". The detector 6 also produces a horizontal sync signal HD and a vertical sync signal VD from the acquired sync component, In this sync detection, the mixture ot the horizontal sync component and vertical sync component is acquired first using the difference between the amplitude of the sync component and the amplitudes of the other signal components. Then, the mixed component is separated into the horizontal sync component and vertical sync component using the difference in frequency between those components.

The first PLL 7 receives the horizontal sync signal HD from the sync detector 6 and produces the first sampling clock signal SC1 for the luminance signal "y" based on the horizontal sync signal HD. In the NTSC form, for example, the first PLL 7 is configured so that a clock signal 25 obtained by frequency-dividing the first sampling clock signal SC1 by 910 synchronizes with the horizontal sync signal HD. Accordingly, the first A/D converter 3 produces 910 pieces of luminance data within one horizontal scan period.

The burst detector 8 receives the image signal "i" and selectively extracts a burst signal CB, as shown in FIG. 2, from the image signal "i" for phase synchronization of the chrominance component. The burst signal CB has a fixed, predetermined frequency (e.g., 3.58 MHZ). The burst signal CB is previously superimposed on the image signal "i" at a predetermined position of the image signal "i", e.g., at the back porch of each horizontal blanking period. The burst signal CB is therefore selectively extracted from the image signal "i" at the beginning of each horizontal scan period.

The second PLL 9 receives the burst signal CB from the burst detector 8 and produces the second sampling clock signal SC2 for the chrominance signal c based on the burst signal CB. The second sampling clock signal SC2 has the sane period as the first sampling clock signal SC1. In the NTSC form, for example, the second PLL 9 is configured so that a clock signal obtained by frequency-dividing the second sampling clock signal SC2 by 4 synchronizes with the burst signal CB. Accordingly, the second sampling clock signal SC2 having a frequency of 14.32 MHZ is produced on the basis of the burst signal CB having a frequency of 3.58 MHZ.

The image data processor 10 receives the luminance data Y0 and chrominance data C0 respectively from the first and second A/D converters 3 and 5, piece by piece, and performs predetermined signal processing to produce new luminance data Y and color difference data U and V. The color difference data U and V respectively represent the differences between the luminance component and the red and blue components.

The process of producing the luminance data "Y" involves processes such as an aperture process and a gamma compensation process. The aperture process is to emphasize the contrast of an image. The gamma compensation is to compensate a visual non-linearity with respect to the luminance level. The process of producing the color difference data U-and V involves processes, such as demodulation of the chrominance component, which has previously undergone balanced modulation, and white balance adjustment. Thereafter, the subtraction between the individual chrominance components and the luminance component is performed.

The image data processor 10 is configured to sample again one of the luminance data Y0 and the chrominance data C0 in consideration of the difference between the output timing for the former data Y0 and the output timing for the latter data C0. This structure compensates for the difference between the output timings for the luminance data Y0 and chrominance data C0. Therefore, this processor 10 supplies the luminance data Y and color difference data U and V to the recording system or the reproducing system at the same timing.

From the viewpoint of the operational characteristic of a PLL, it is difficult to use a single PLL for both the. first and second PLLs 7 and 9, which are respectively provided at the subsequent stages of the sync detector 6 and the burst detector 8. The luminance component is superimposed on the image signal "i" based on the horizontal sync signal HD, and the chrominance component is superimposed on the image signal "i" based on the burst signal. For the ordinary image signal "i", the horizontal sync signal HD and the burst signal CB scarcely synchronize with each other. This is because the period of the horizontal sync signal HD greatly varies due to the influence of a jitter included in the image signal "i", while the period of the burst signal CB, which has a fixed pattern, does not change significantly. The quantization of the luminance signal "y" and the chrominance signal "c" using the same sampling clock signal causes a deviation between the luminance data and color difference data due to the phase difference between the horizontal sync signal HD and the burst signal CB. In digital signal processing, particularly, the deviation between the luminance data "Y" and color difference data U and V clearly appears as the disturbance of the outline of an image or oozing color on the reproduced image. The use of the mutually independent first and second PLLs 7 and 9, however, enlarges the circuit area and results in increased costs.

Another disadvantage lies in that the mutually independent first and second PLLs 7 and 9 serve as two kinds of oscillation sources to oscillate frequencies close to each other. The oscillation of those two kinds of oscillation sources causes swell noise to be generated relatively easily. This low-frequency beat noise is likely to appear on the reproduced image. In other words, although digital signal processing provides a noise immune environment, noise is generated due to the quantization, or sampling.

SUMMARY OF THE INVENTION

Broadly speaking, the present invention relates to an image information processing apparatus that suppresses noise generated in digital signal processing while preventing the circuit scale from enlarging. The present invention can be implemented in numerous ways including as an apparatus and a method.

In a first embodiment of the invention, an image information processing apparatus produces luminance data and chrominance data from an image signal including a luminance component and a chrominance component. A scan sync signal and a color sync signal are overlaid on the image signal. The scan sync signal is used for determining a scan timing. The color sync signal is used to ensure synchronization for the chrominance component. The apparatus includes a separator, a first detector, a second detector, a phase-locked loop, an A/n converter, a phase difference detector, a chrominance data processor and a luminance data processor. The separator separates the luminance component and the chrominance component from the image signal to produce a luminance signal and a chrominance signal. The first detector extracts the color sync signal overlaid on the image signal. The second detector extracts the scan sync signal overlaid on the image signal. The phase-locked loop is connected to the first detector and receives the color sync signal to produce a reference clock signal having a constant period referring the color sync signal. The A/D converter receives the luminance signal, the chrominance signal and the reference clock signal. The A/D converter quantizes the luminance signal and the chrominance signal in accordance with the reference clock signal to produce digital luminance data and chrominance data. The phase difference detector is connected to the phase-locked loop and the second detector and receives the reference clock signal and the scan sync signal to detect a phase difference between the reference clock signal and the scan sync signal. The chrominance data processor is connected to the A/D converter and receives the chrominance data to perform predetermined first digital processing on the chrominance data. The luminance data processor is connected to the A/D converter and the phase difference detector and receives the luminance data and the phase difference to compensate the luminance data in accordance with the phase difference. The luminance data processor sets a ratio for combining two consecutive pieces of luminance data in accordance with the phase difference and combines the luminance data in units of two pieces to produce compensated luminance data. The luminance data processor further performs predetermined second digital processing on the compensated luminance data.

In a second embodiment of the invention, an image information processing apparatus-produces luminance data and chrominance data from an image signal including a luminance component and a chrominance component. A scan sync component and a color sync signal are overlaid on the image signal. The scan sync signal is used for determining a scan timing. The color sync signal is used to ensure synchronization for the chrominance component. The apparatus includes a first detector, a second detector, a phase-locked loop, an A/D converter, a separator, a phase difference detector, a chrominance data processor and a luminance data processor. The first detector for extracts the color sync signal overlaid on the image signal. The second detector extracts the scan sync signal overlaid on the image signal. The phase-locked loop is connected to the first detector and receives the color sync signal to produce a reference clock signal having a constant period referring the color sync signal. The A/D converter is connected to the first detector and receives the reference clock signal to quantize the image signal in accordance with the reference clock signal to produce digital image data. The separator is connected to the A/D converter and separates the luminance component and the chrominance component from the image data to produce a luminance data and a chrominance data. The phase difference detector is connected to the phase-locked loop and the second detector and receives the reference clock signal and the scan sync signal to detect a phase difference between the reference clock signal and the scan sync signal. The chrominance data processor is connected to the separator and receives the chrominance data to perform predetermined first digital processing on the chrominance data. The luminance data processor is connected to the separator and the phase difference detector and receives the luminance data and the phase difference to compensate the luminance data in accordance with the phase difference. The luminance data processor sets a ratio for combining two consecutive pieces of luminance data in accordance with the phase difference and combines the luminance data in units of two pieces to produce compensated luminance data. The luminance data processor further performs predetermined second digital processing on the compensated luminance data.

Other aspects and advantages of the Invention will become apparent from the following description, taken in conjunction with the accompanying drawings, illustrating by way of example the principals of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Figure 3:
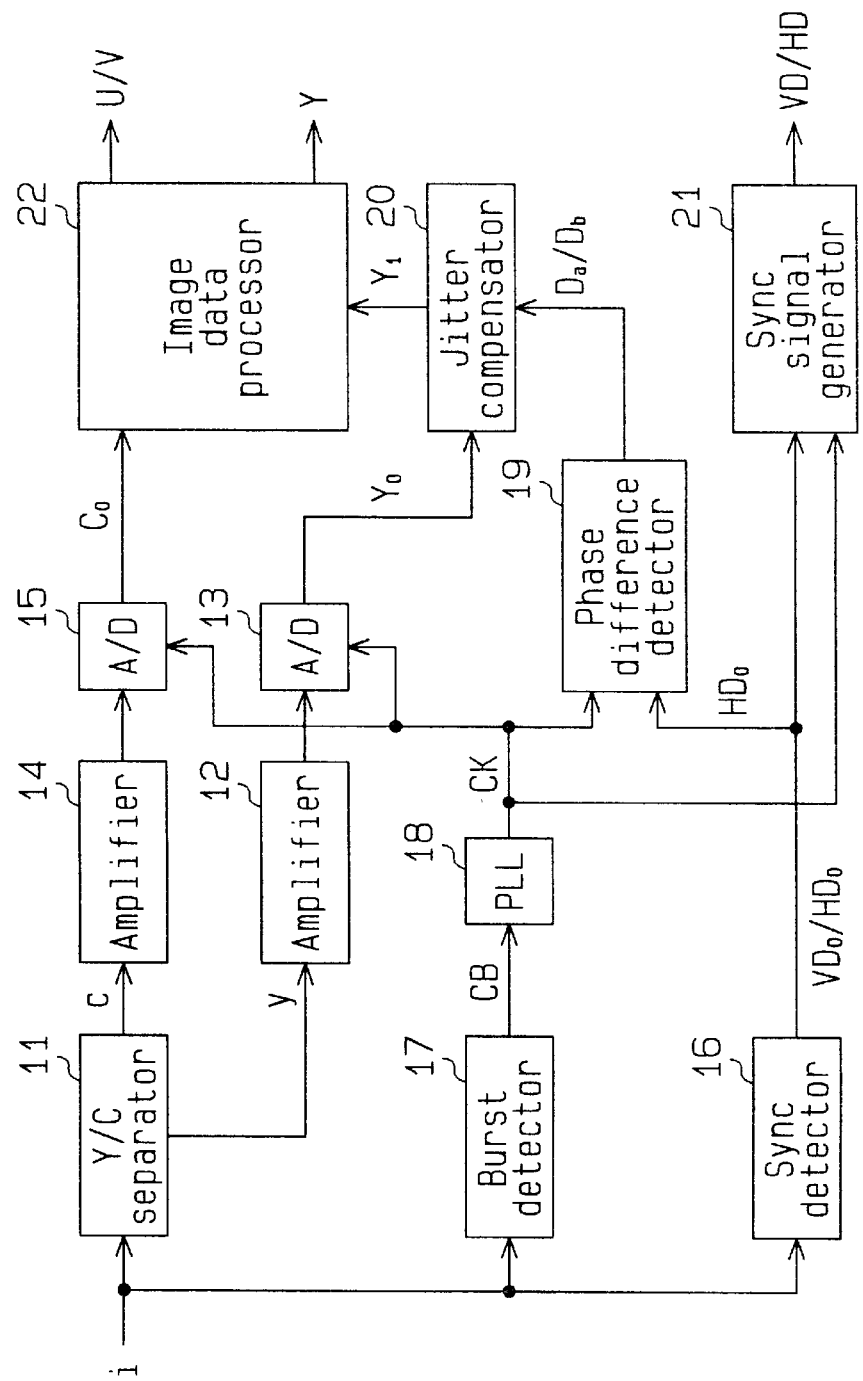
FIG. 3 is a block diagram illustrating an image information processing apparatus according to the first embodiment of the invention.

An image information processing apparatus according to the first embodiment of the present invention will now be described referring to the accompanying drawings. As shown in FIG. 3, the image information processing apparatus according to the first embodiment includes a Y/C separator 11, first and second amplifiers 12 and 14, first and second A/D converters 13 and 15, a sync detector 16, a burst detector 17, a phase-locked loop (PLL) 18, a phase difference detector 19, a jitter compensator 20, a sync signal generator 21, and an image data processor 22.

Figure 1:
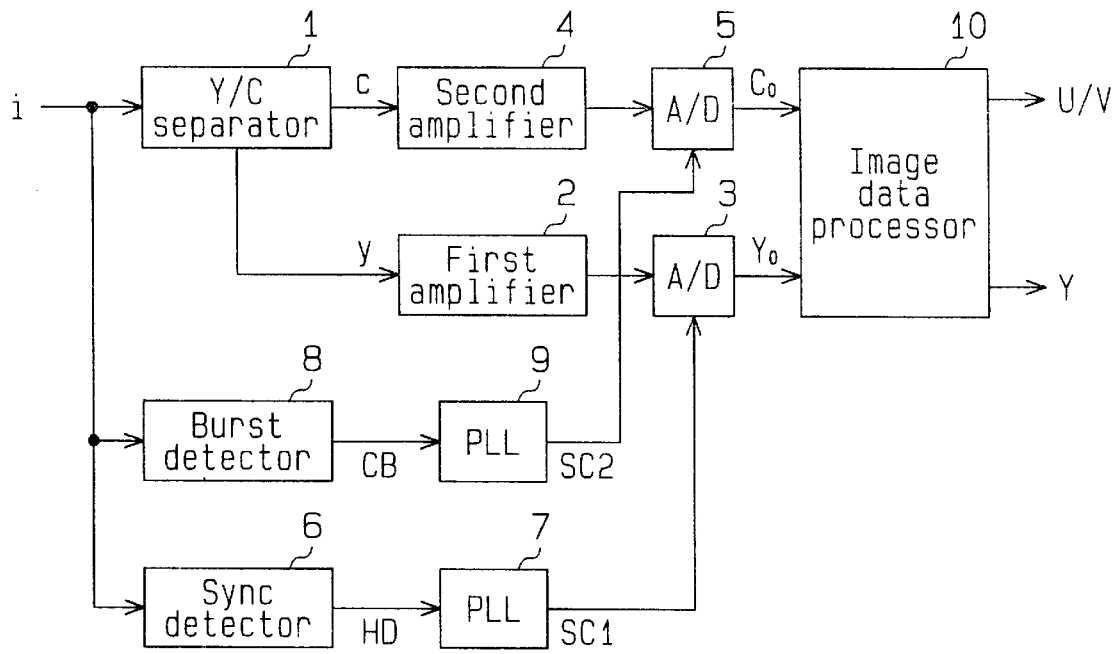
FIG. 1 is a block diagram showing an image information processing apparatus according to prior art.
Figure 2:
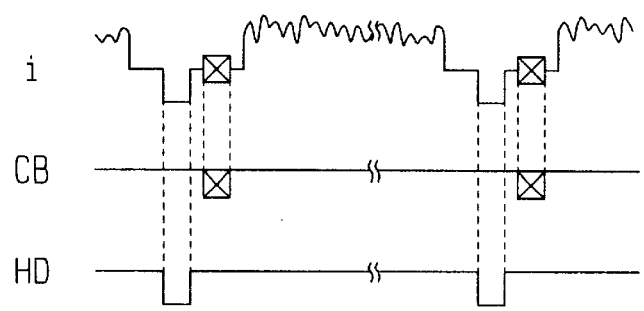
FIG. 2 is a waveform chart illustrating an image signal and a sync signal which are handled in the apparatus in FIG. 1.

The Y/C separator 11 receives an image signal "i" and separates a luminance component and a chrominance component from the image signal "i" to thereby produce a luminance signal "y" and a chrominance signal "c". The first amplifier 12 amplifies the separated luminance signal "y" to have a predetermined amplitude. The first A/D converter 13 quantizes the amplified luminance signal "y" in a given period to produce luminance data Y0. The second amplifier 14 amplifies the separated chrominance signal "c" to have a predetermined amplitude. The second A/D converter 15 quantizes the amplified chrominance signal "c" in a given period to produce chrominance data C0. That is, the Y/C separator 11, first and second amplifiers 12, 14 and first and second A/D converters 13, 15 have the same structures as those of the prior art in FIG. 1.

The sync detector 16 receives the image signal "i" and extracts a sync component from the image signal "i". The detector 16 produces a horizontal sync signal HD0 and a vertical sync signal VD0 based on that sync component. The horizontal sync signal HD0 determines the timing for the horizontal scanning, and the vertical sync signal VD0 determines the timing for the vertical scanning.

The burst detector 17 receives the image signal "i" and selectively extracts a burst signal CB from the image signal "i". The burst signal CB is a signal superimposed on the image signal "i" in a specific period and is used for phase synchronization for the chrominance component.

The PLL 18 receives the burst signal CB from the burst detector 17 produces a reference clock signal CK having a given period based on the burst signal CB. This reference clock signal CK is supplied to the first and second A/D converters 13 and 15. Thus, the first and second A/D converters 13 and 15 share the reference clock signal CK as a sampling clock signal. According to the first embodiment which conforms to the NTSC form, the PLL circuit 18 is configured so that a clock signal obtained by frequency-dividing the reference clock signal CK by 4 becomes synchronous with the burst signal CB.

Figure 4:
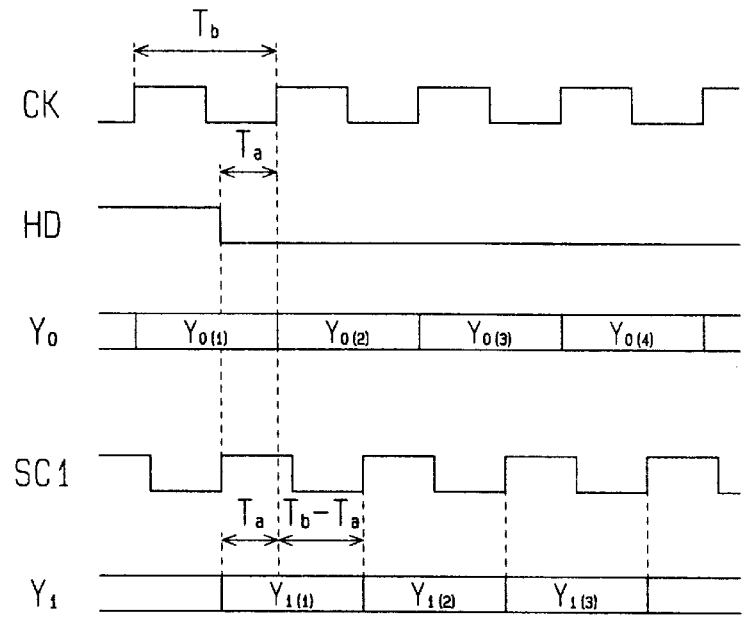
FIG. 4 is a timing chart which is referred to in explaining the operation of a jitter compensator incorporated in the apparatus in FIG. 3.

The phase difference detector 19 receives the reference clock signal CK from the PLL circuit 18 and receives the horizontal and vertical sync signals HD0, VD0 from the sync detector 16. Suppose that there is a deviation of a period Ta between the reference clock signal CK and the horizontal sync signal HD0 as shown in FIG. 4. Then, the detector 19 detects the period Ta from the falling edge of the horizontal sync signal HD0 to the next rising edge of the reference clock signal CK. The detector 19 outputs first data Da indicating that period Ta. At the same time, the detector 19 measures a period Tb of the reference clock signal CK and outputs second data Db indicating that period Tb.

The jitter compensator 20 receives the first and second data Da, Db from the phase difference detector 19 and receives the luminance data Y0 from the second A/D converter 15. Based on the first and second data Da, Db, the compensator 20 compensates the luminance data Y0 piece by piece to produce compensated luminance data Y1. Specifically, the compensator 20 is configured to perform an arithmetic operation according to the following equation 1 on the consecutive luminance data Y0(n), thereby yielding compensated luminance data Y1(n).

$$Y1(n) = \frac{Da}{Db} \cdot Y0(n-1) + \left(1 - \frac{Da}{Db}\right) \cdot Y0(n) \qquad (1)$$

The compensated luminance data Y1(n) is acquired by combining one piece or luminance data Y0(n−1) and the next consecutive luminance data Y0(n). The combining ratio is set to Da:Db−Da (Ta:Tb−Ta). As shown in FIG. 4, the compensated luminance data Y1(n) is synchronous with the first sampling clock signal SC1 that is produced by the PLL circuit in the prior art. In other words, according to the first embodiment, luminance data Y1(n) synchronizing with the first sampling clock signal can be obtained without using a particular PLL circuit.

The sync signal generator 21 receives the reference clock signal CK from the PLL circuit 18 and receives the vertical and horizontal sync signal VD0, HD0 from the sync detector 16. The generator 21 has a counter (not shown) for counting the number of pulses of the reference clock signal and a decoder (not shown) for decoding the count value of the counter. The generator 21 produces new vertical and horizontal sync signals VD, HD from the vertical and horizontal sync signals VD0, HD0 based on the decoded count value. The counter of this generator 21 is configured to operate in accordance with the vertical scan period and horizontal scan period. The generator 21 also produces various timing signals associated with the vertical scan period and horizontal scan period.

The image data processor 22 receives the compensated luminance data Y1 from the jitter compensator 20 piece by piece and receives the chrominance data C0 from the second A/D converter 15 piece by piece. The processor 22 performs predetermined signal processing on the compensated luminance data Y1 and chrominance data C0 to generate new luminance data "Y" and color difference data "U", "V". The processor 22 performs processes, such as an aperture process and gamma compensation, to produce the luminance data "Y" and performs color decoding, white balance adjustment, etc. to produce the color difference data "U", "V". The jitter compensator 20 and the image data processor 22 serve as a luminance data processor. The image data processor 22 also serves as a chrominance data processor.

The first and second A/D converters 13 and 15 operate at the same timing in accordance with the same clock signal CK. Therefore, the input timing for the compensated luminance data Y1 to the image data processor 22 substantially coincides with the input timing for the chrominance data C0 to the processor 22. This eliminates the need for adjusting the input timings for both data.

According to the first embodiment, as described above, the use of the jitter compensator 20 compensates a deviation between the luminance data "Y" and the color difference data "U" or "V", which is caused by the phase difference between the horizontal sync signal HD0 and the burst signal CB. This compensation can provide the optimal luminance data Y1 corresponding to the chrominance data C0. In other words, the jitter compensator 20 is effective in preventing the disturbance of the outline of an image or oozing color from appearing on the reproduced image while suppressing the occurrence of noise even with the use of a single PLL circuit.

Further, the first and second A/D converters 13 and 15 operate at the same timing in accordance with the same reference clock signal that is generated by the single PLL circuit 18. Therefore, it is unnecessary to adjust the input timings for the luminance data and the chrominance data to the image data processor 22.

Figure 5:
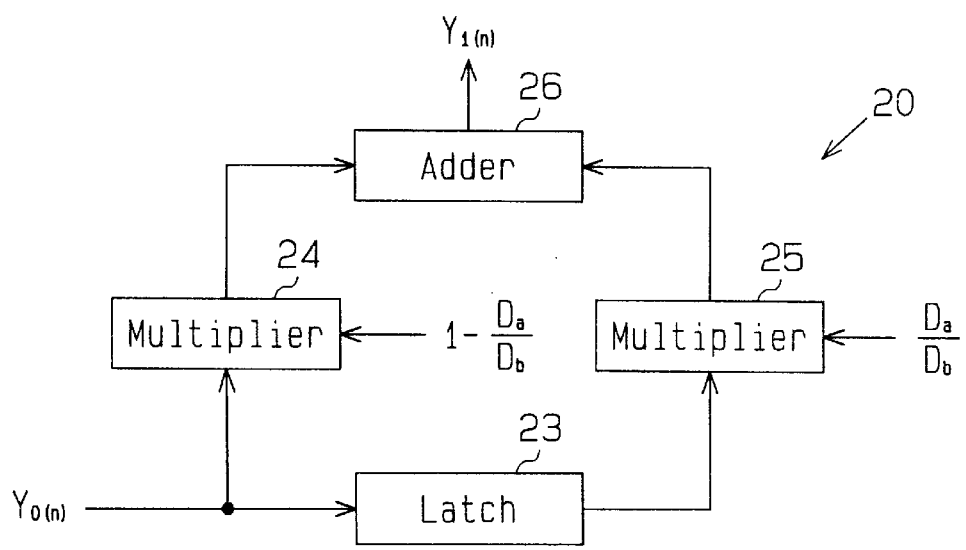
FIG. 5 is a block diagram of the jitter compensator.

As shown in FIG. 5, the jitter compensator 20 includes a latch 23, first and second multipliers 24 and 25 and an adder 26.

The latch 23 consecutively receives the luminance data Y0(n) from the first A/D converter 13 piece by piece, and holds that luminance data Y0(n) for one clock period of the reference clock signal.

The first multiplier 24 performs the operation of the second term on the right-hand side of the equation 1. That is, the first multiplier 24 receives the luminance data Y0(n) from the first A/D converter 13 and multiplies that luminance data Y0(n) by a coefficient (Da/Db) to yield a first multiplication result.

The second multiplier 25 performs the operation of the first term on the right-hand side of the equation 1. That is, the second multiplier 25 receives the previous-by-one luminance data Y0(n−1) from the latch 23 and multiplies that luminance data Y0(n−1) by a coefficient (1−Da/Db) to yield a second multiplication result.

The adder 26 receives the first and second multiplication results from the first and second multipliers 24 and 25 and adds both to yield compensated luminance data Y1(n). The above structure allows the operation according to the equation 1 to be performed to provide luminance data error of which originating from the phase difference between the reference clock signal CK and the horizontal sync signal HD0 has been compensated for.

Figure 6:
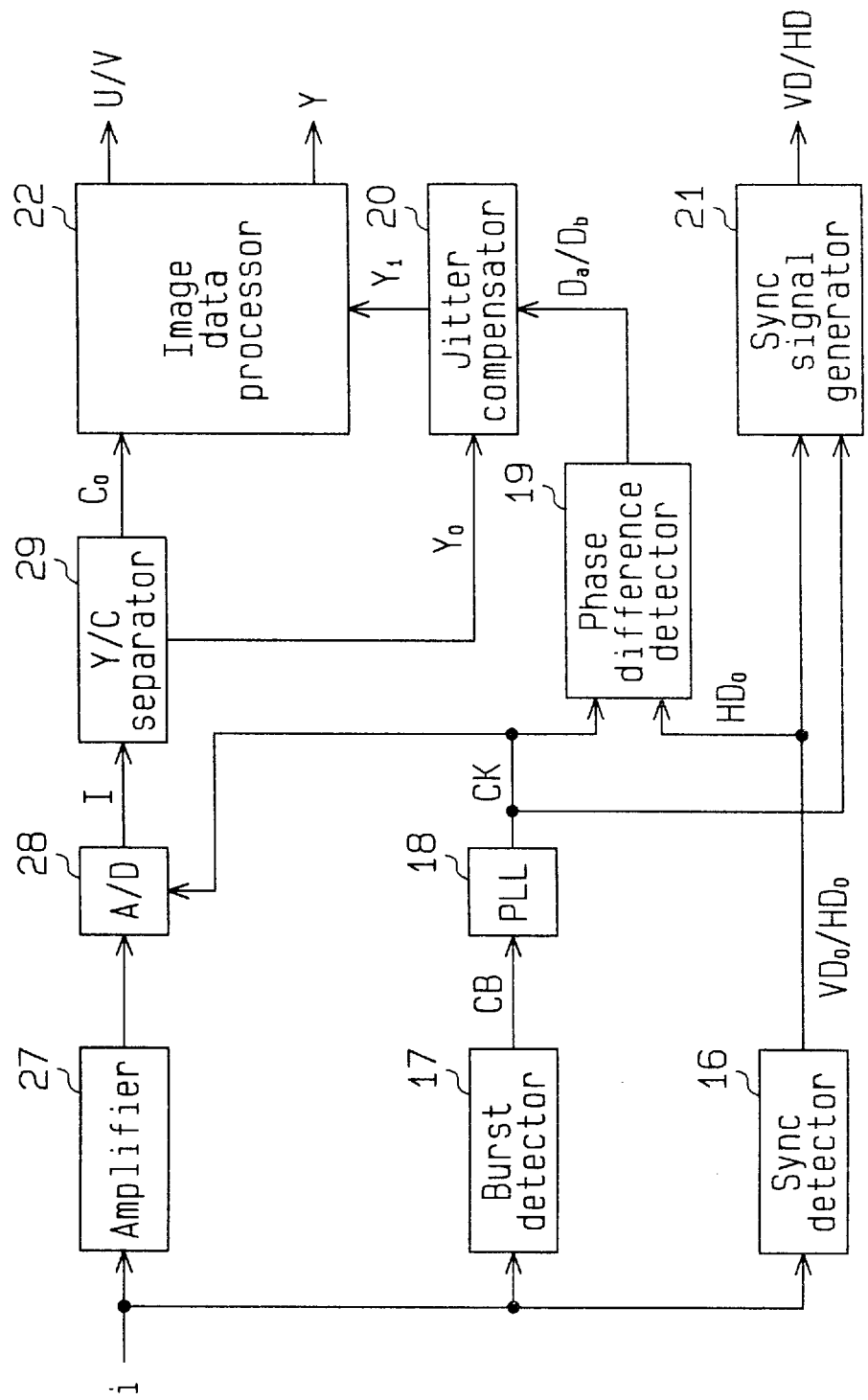
FIG. 6 is a block diagram illustrating an image information processing apparatus according to the second embodiment of the invention.

An image information processing apparatus according to the second embodiment of the invention will be discussed below with reference to the accompanying drawings. To avoid a redundant description, like or same reference numerals are given to those components that are like or the same as the corresponding components of the first embodiment. As shown in FIG. 6, the image information processing apparatus according to the second embodiment separates a luminance component and a chrominance component from an image signal in digital processing. The phase difference detector 19 and the jitter compensator 20 are substantially the same as those of the first embodiment.

The image information processing apparatus of the second embodiment includes an amplifier 27, an A/D converter 28, a Y/C separator 29, a sync detector 16, a burst detector 17, a PLL circuit 18, a phase difference detector 19, a jitter compensator 20, a sync signal generator 21 and an image data processor 22.

The amplifier 27 receives an image signal "i" and amplifies the image signal "i" to a predetermined amplitude. It is preferable that a high-frequency amplifier designed for the video signal band should be used for the amplifier 27.

The A/D converter 28 receives the amplified image signal "i" from the amplifier 27 and the reference clock signal from the PLL circuit 18. The converter 28 quantizes the image signal "i" in accordance with the clock signal to produce image data "I".

The Y/C separator 29 receives the image date "I" from the A/D converter 28 and separates a luminance component and a chrominance component from the image data "I" to produce luminance data Y0 and chrominance data C0. In the NTSC form, for example, the luminance data Y0 is produced by averaging the image data "I" and image data that is shifted from the former image data "I" by one horizontal scan period. The chrominance data C0 is produced by subtracting image data, which is shifted from the image data "I" by one horizontal scan period, from the image data "I".

The jitter compensator 20 receives the luminance data Y0 from the Y/C separator 29 and supplies compensated luminance data Y1 to the image data processor 22. The Image data processor 22 receives the chrominance data C0 from the Y/C separator 29.

According to the second embodiment, as described above, an image signal is converted to digitized image data using the single amplifier 27 and the single A/D converter 28. This structure prevents the circuit area from being enlarged. Further, as the amount of digital processing in the image information processing apparatus increases, the apparatus becomes less susceptible to noise or the like. This results in an improvement of the operational characteristic of the image information processing apparatus.

Although only two embodiments of the present invention have been described herein, it should be apparent to those skilled in the art that the present invention may be embodied in many other specific forms without departing from the spirit or scope of the invention. Therefore, the present examples and embodiments are to be considered as illustrative and no-c restrictive and the invention is not to be limited to the details given herein, but may be modified within the scope and equivalence of the appended claims.

What is claimed is:

1. An image information processing apparatus for producing luminance data and chrominance data from an image signal including a luminance component and a chrominance component, a scan sync signal and a color sync signal being overlaid on said image signal, said scan sync signal being used for determining a scan timing, said color sync signal being used to ensure synchronization for said chrominance component, said apparatus comprising:

a separator for separating said luminance component and said chrominance component from said image signal to produce a luminance signal and a chrominance signal;

a first detector for extracting said color sync signal overlaid on said image signal;

a second detector for extracting said scan sync signal overlaid on said image signal;

a phase-locked loop, connected to said first detector, for receiving said color sync signal and producing a reference clock signal having a constant period referring said color sync signal;

an A/D converter for receiving said luminance signal, said chrominance signal and said reference clock signal and quantizing said luminance signal and said chrominance signal in accordance with said reference clock signal to produce digital luminance data and chrominance data;

a phase difference detector, connected to said phase-locked loop and said second detector, for receiving said reference clock signal and said scan sync signal and detecting a phase difference between said reference clock signal and said scan sync signal;

a chrominance data processor, connected to said A/D converter, for receiving said chrominance data and performing predetermined first digital processing on said chrominance data; and a luminance data processor, connected to said A/D converter and said phase difference detector, for receiving said luminance data and said phase difference and compensating said luminance data in accordance with said phase difference, said luminance data processor setting a ratio for combining two consecutive pieces in accordance with said ratio of luminance data in accordance with said phase difference and combining said luminance data in units of two pieces to product compensated luminance data, said luminance data processor further performing predetermined second digital processing on said compensated luminance data.

2. The apparatus according to claim 1, wherein said luminance data processor sets said combining ratio based on a ratio of one period of said reference clock signal to said phase difference.

3. The apparatus according to claim 1, wherein said luminance data processor includes a jitter compensator, connected to said A/D converter and said phase difference detector, for combining said luminance data in units of two pieces in accordance with said sat ratio to produce compensated luminance data.

4. The apparatus according to claim 3, wherein said set ratio includes first and second coefficients; and said jitter compensator includes:

a latch for temporarily holding first luminance data;

a first multiplier, connected to said latch, for multiplying said first luminance data by said first coefficient to yield a first multiplication result;

a second multiplier for multiplying second luminance data following said first luminance data by said second coefficient to yield a second multiplication result; and an adder, connected to said first and second multipliers, for adding said first multiplication result end said second multiplication result together to produce said compensated luminance data.

5. An image information processing apparatus for producing luminance data and chrominance data from an image signal including a luminance component and a chrominance component, a scan sync signal and a color sync signal being overlaid on said image signal, said scan sync signal being used for determining a scan timing, said color sync signal being used to ensure synchronization for said chrominance component, said apparatus comprising:

a first detector for extracting said color sync signal overlaid on said image signal;

a second detector for extracting said scan sync signal overlaid on said image signal;

a phase-locked loop, connected to said first detector, for receiving said color sync signal and producing a reference clock signal having a constant period referring said color sync signal;

an A/D converter, connected to said first detector, for receiving said reference clock signal and quantizing said image signal in accordance with said reference clock signal to produce digital image data;

a separator, connected to said A/D converter, for receiving said image date and separating said luminance component and said chrominance component from said image data to product a luminance data and a chrominance data;

a phase difference detector, connected to said phase-locked loop and said second detector, for receiving said reference clock signal and said scan sync signal and detecting a phase difference between said reference clock signal and said scan sync signal;

a chrominance data processor, connected to said separator, for receiving said chrominance data and performing predetermined first digital processing on said chrominance data; and a luminance data processor, connected to said separator and said phase difference detector, for receiving said luminance data and said phase difference and compensating said luminance data in accordance with said phase difference, said luminance data processor setting a ratio for combining two consecutive pieces in accordance with said ratio of luminance data in accordance with said phase difference and combining said luminance data in units of two pieces to produce compensated luminance data, said luminance data processor further performing predetermined second digital processing on said compensated luminance data.

6. The apparatus according to claim 5, wherein said luminance data processor sets said combining ratio based on a ratio of one period of said reference clock signal to said phase difference.

7. The apparatus according to claim 5, wherein said luminance data processor includes a jitter compensator, connected to said separator and said phase difference detector, for combining said luminance data in units of two pieces in accordance with said set ratio to produce compensated luminance data.

8. The apparatus according to claim 7, wherein said set ratio includes first and second coefficients; and said jitter compensator includes:

a latch for temporarily holding first luminance data;

a first multiplier, connected to said latch, for multiplying said first luminance data by said first coefficient to yield a first multiplication result;

a second multiplier for multiplying second luminance data following said first luminance data by said second coefficient to yield a second multiplication result; and an adder, connected to said first and second multipliers, for adding said first multiplication result and said second multiplication result together to produce said compensated luminance data.

\* \* \* \* \*